Nov. 7, 1933.                T. BROWN                 1,933,540
                              TRACTOR
                  Original Filed Oct. 16, 1929    6 Sheets-Sheet 1
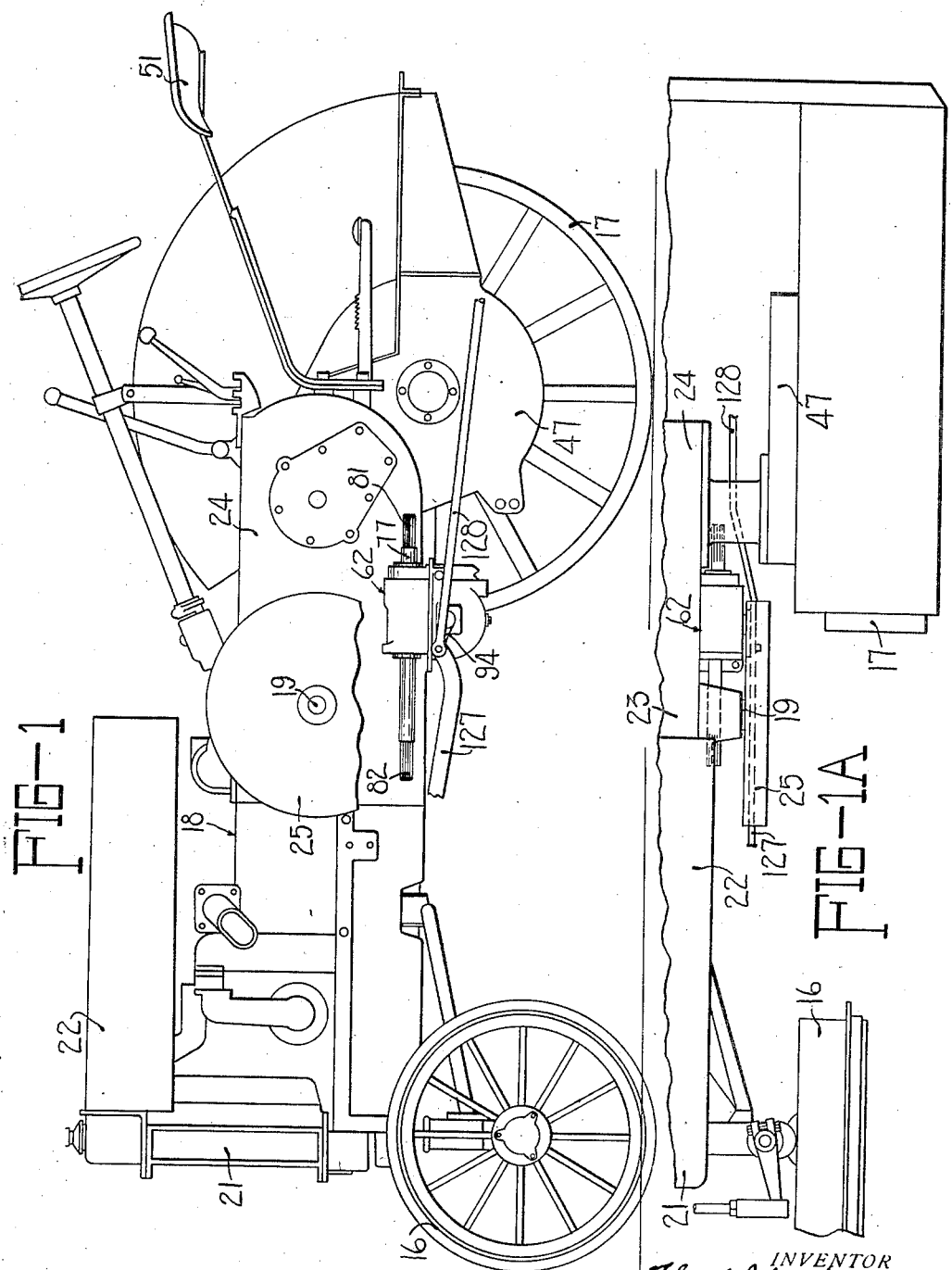
WITNESS.
Edward Medin.
INVENTOR
Theophilus Brown
BY
Brown, Jackson, Boettcher & Dienner
ATTORNEYS

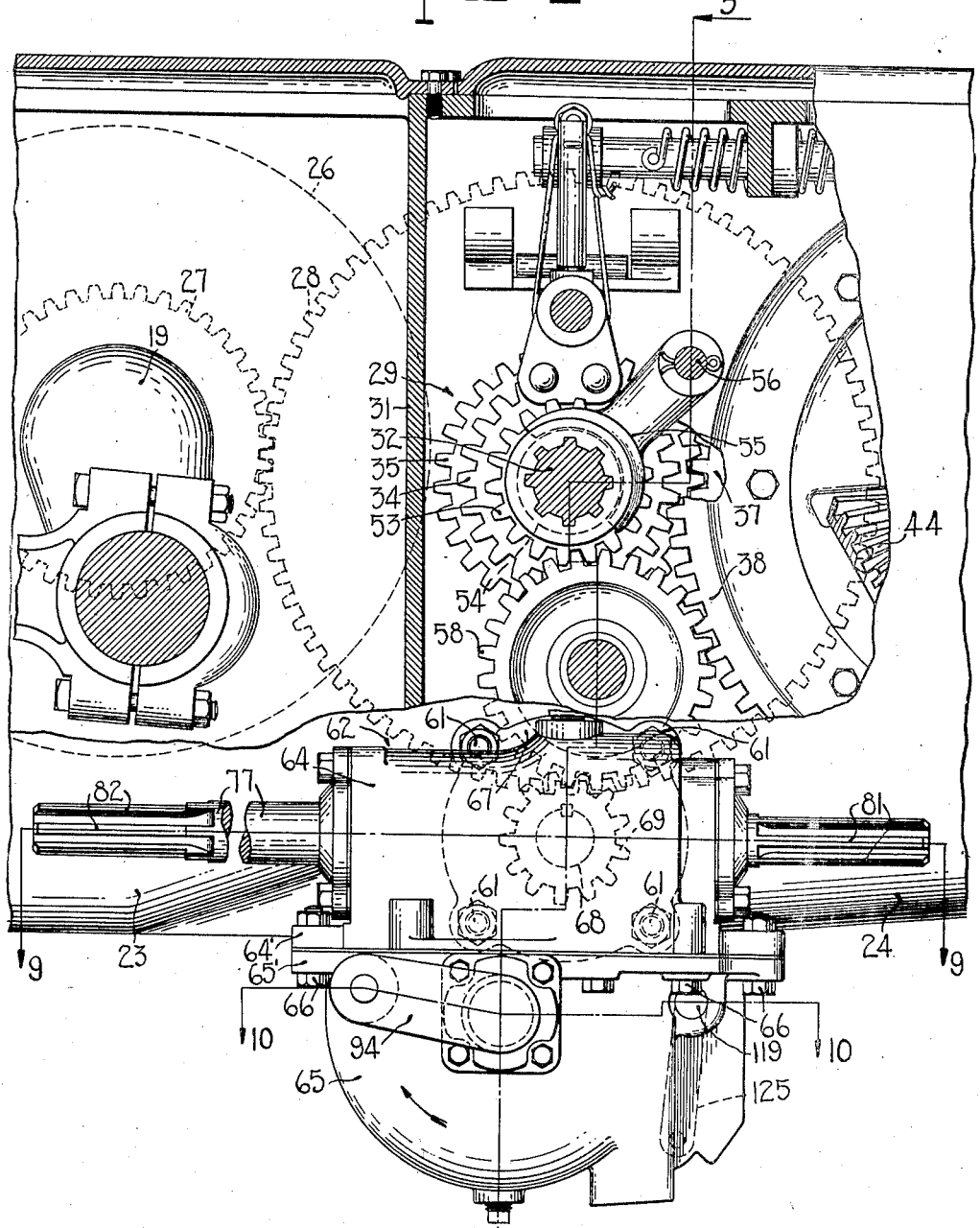

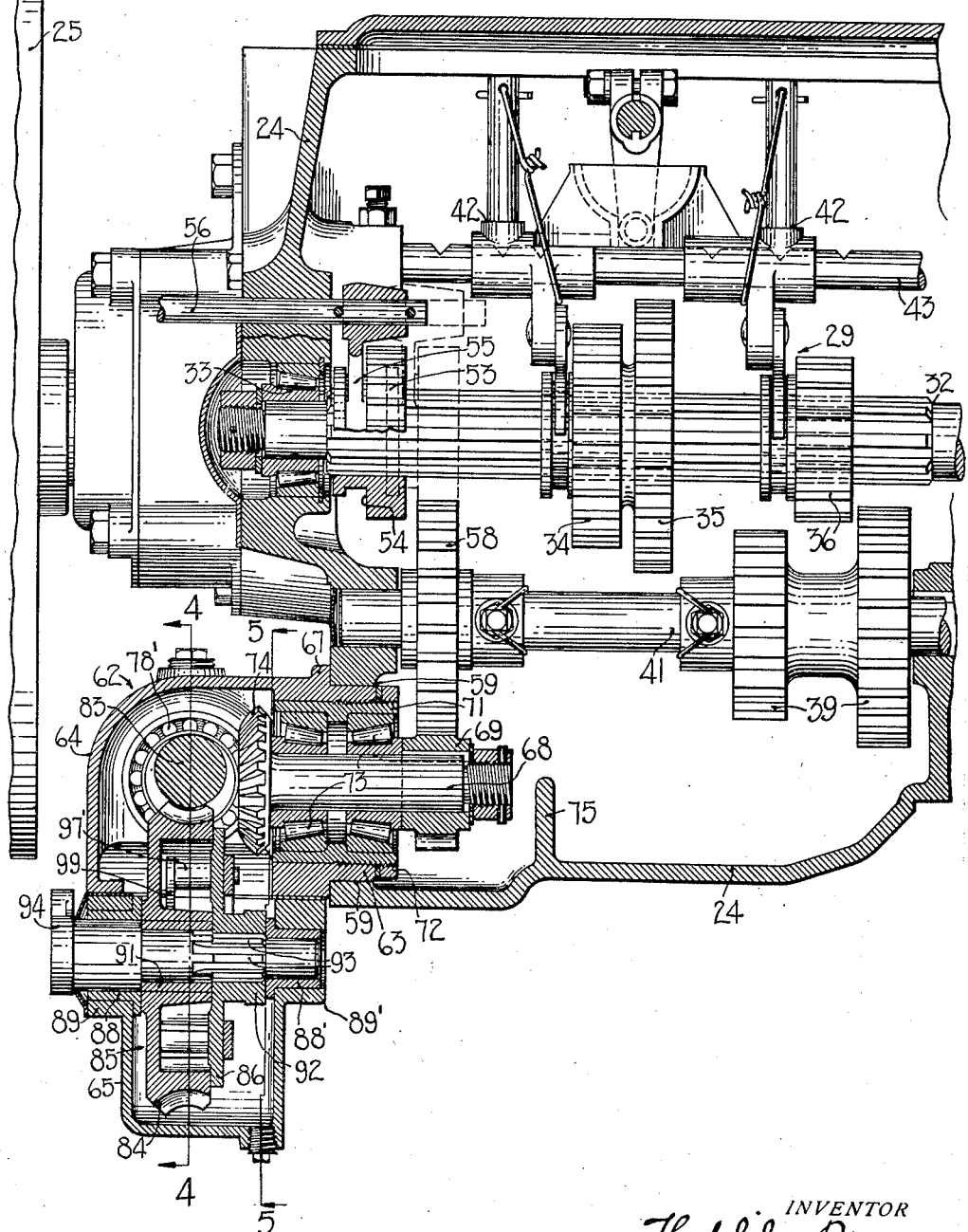

Nov. 7, 1933.                    T. BROWN                    1,933,540
                                  TRACTOR
                   Original Filed Oct. 16, 1929      6 Sheets-Sheet 4
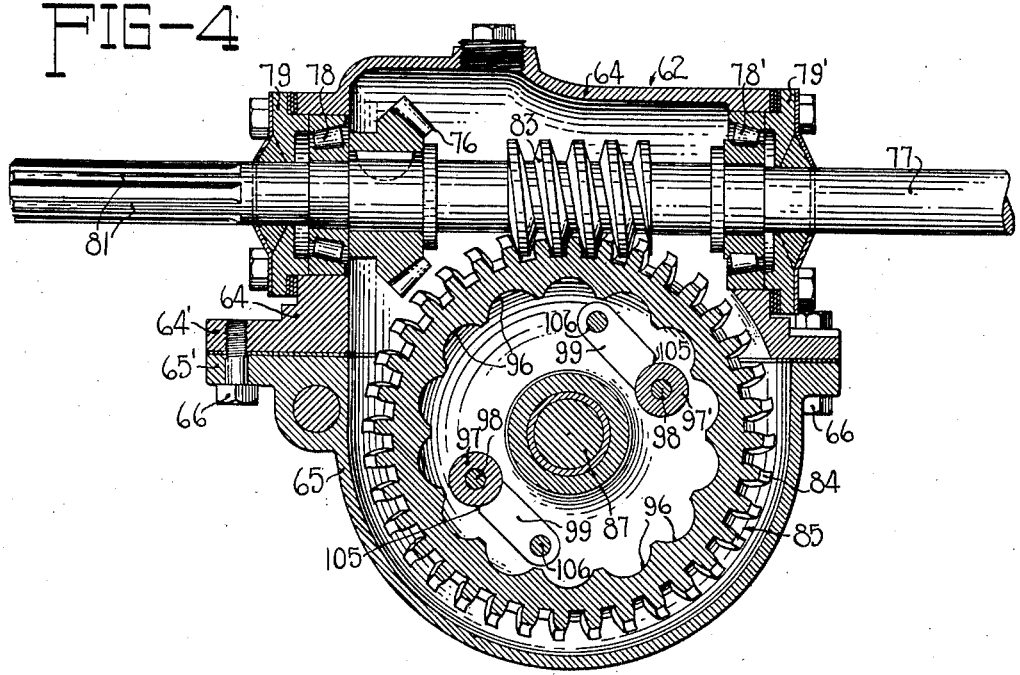
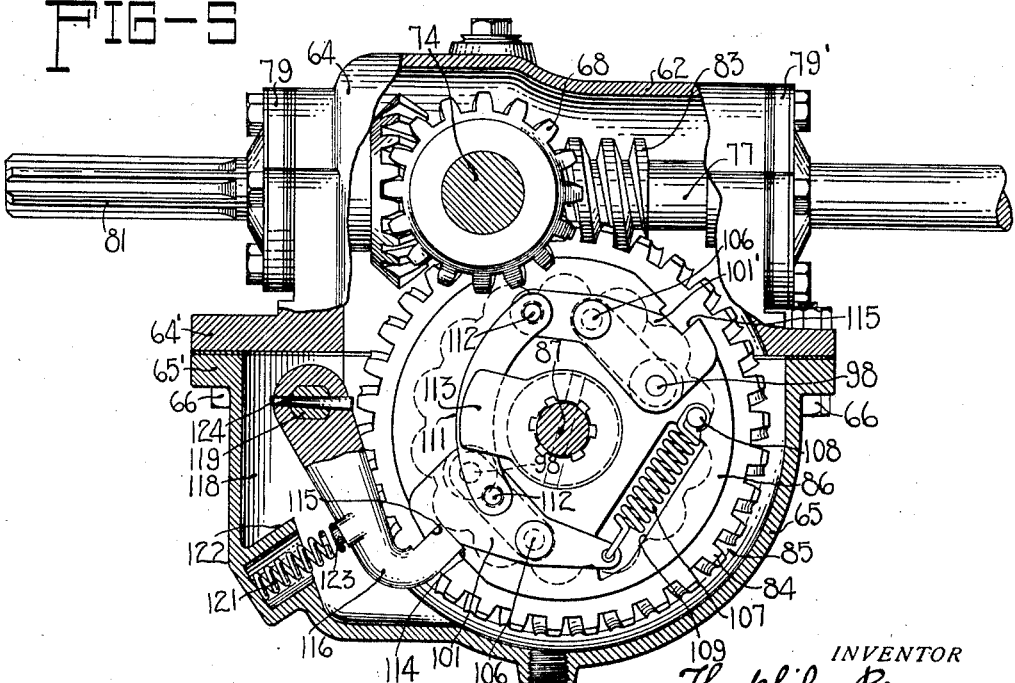

Nov. 7, 1933.　　　　　T. BROWN　　　　　1,933,540
TRACTOR
Original Filed Oct. 16, 1929　　6 Sheets-Sheet 5
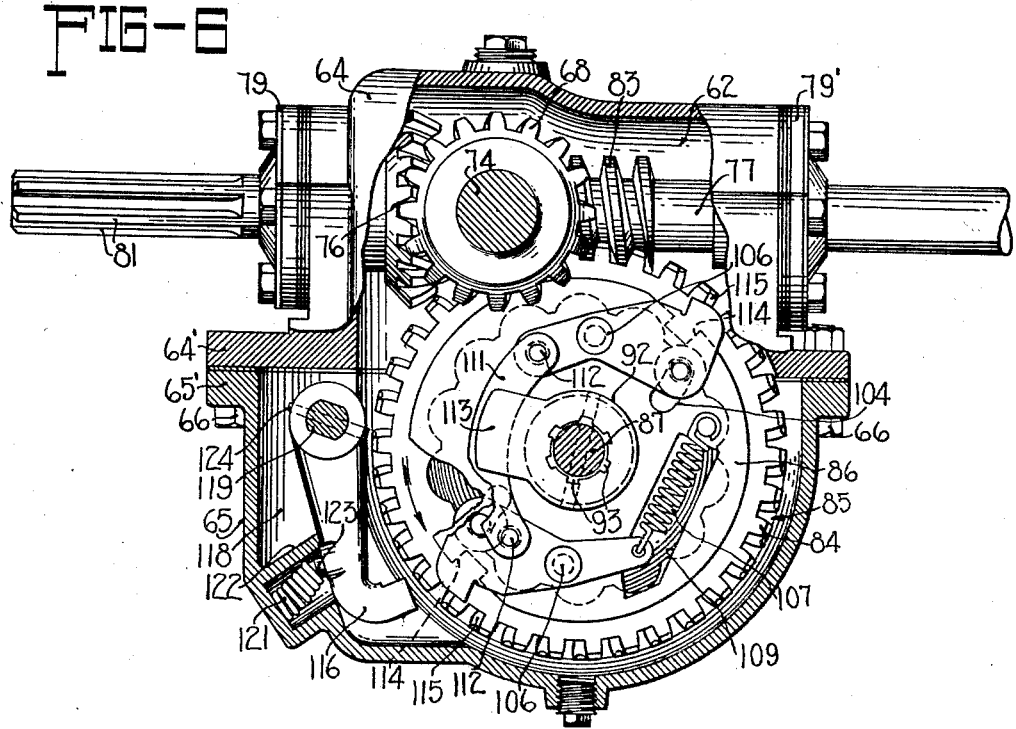
FIG-6
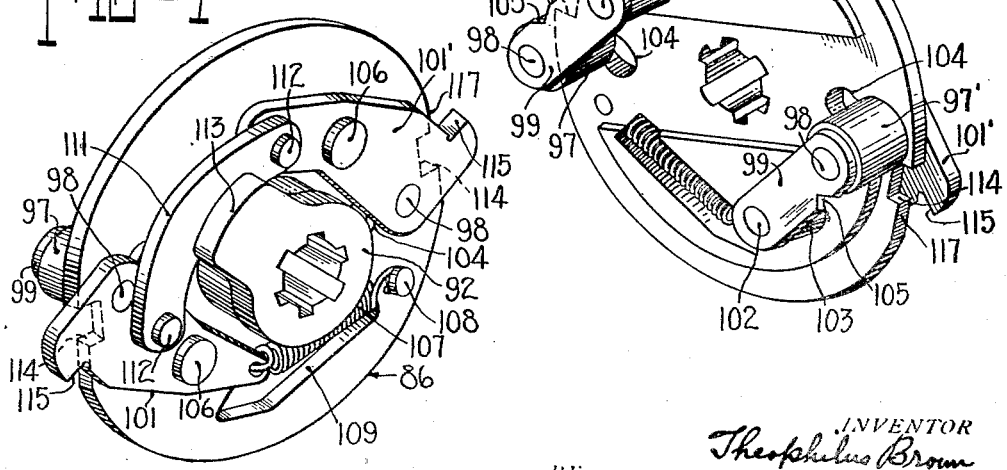
FIG-7
FIG-8
WITNESS.
Edward Melin.
INVENTOR
Theophilus Brown
BY
Brown, Jackson, Boettcher & Dienner
ATTORNEYS Nov. 7, 1933.  T. BROWN  1,933,540
TRACTOR
Original Filed Oct. 16, 1929    6 Sheets-Sheet 6
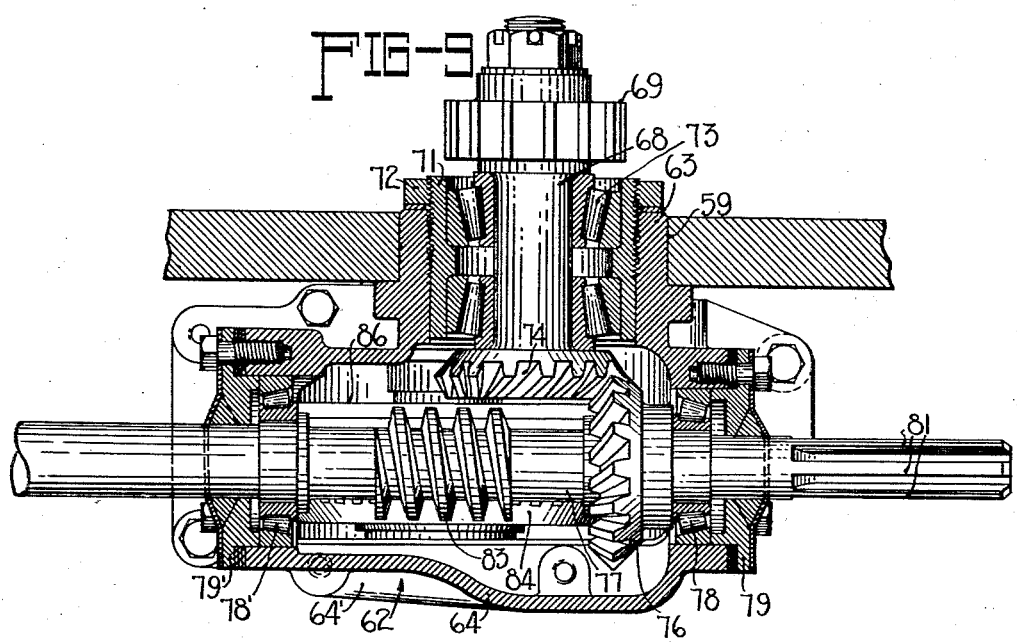
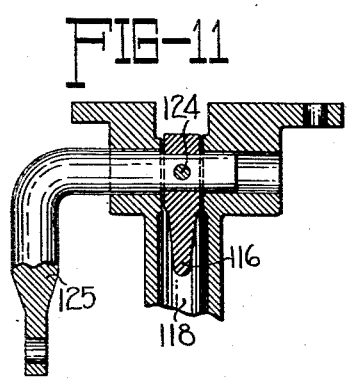
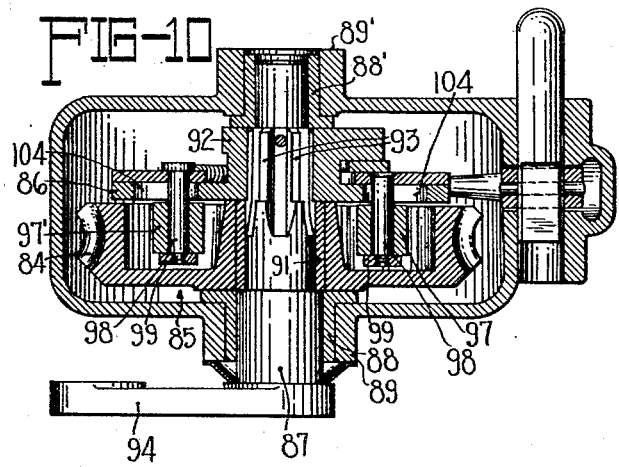
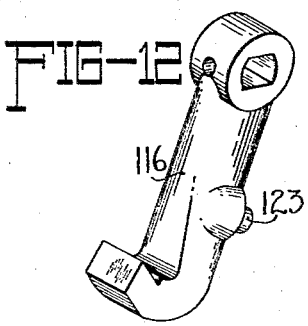
INVENTOR
Theophilus Brown
BY Brown, Jackson, Boettcher & Dienner
ATTORNEYS
WITNESS.
Edward Melin.

Patented Nov. 7, 1933

1,933,540

UNITED STATES PATENT OFFICE

1,933,540

TRACTOR

Theophilus Brown, Moline, Ill., assignor to Deere & Company, Moline, Ill., a corporation of Illinois Original application October 16, 1929, Serial No. 399,980. Divided and this application March 25, 1933. Serial No. 662,728

29 Claims. (Cl. 180—53)

This application is a division of the copending application, Serial No. 399,980, for Tractors, filed by Linwood A. Murray and myself on October 16, 1929.

The present invention relates to tractors and has as its general object to provide an improved tractor adapted primarily for propelling farm implements and characterized by improved means whereby the power of the tractor engine can be utilized to perform secondary operations at the implement in addition to the primary operation of propelling the same.

With the continued advance in power farming and the desire to perform practically every implement operation with but one operator, there has been an increasing demand for tractors which can perform a wide variety of secondary duties in addition to propelling the implement. For example, it is of great advantage in corn picking implements to be able to drive the corn picking and husking mechanisms directly from the power plant of the tractor; and to be able to drive in the same manner the seed selecting mechanisms of planters, the beater mechanism and feeding apron of manure spreaders, etc.

Moreover, in the performance of intermittent operations, such as the lifting of the soil engaging elements of plows, harrows and cultivators, the actuation of bundle carriers on binders, etc., it is of great advantage to be able to perform these operations by power derived directly from the tractor engine.

Such power driving arrangement enables all of these secondary operations to be under the immediate control of the operator on the tractor so that there is no necessity of a second operator on the implement. Such also avoids the necessity of relying upon the traction power of the implement wheels, which is often inadequate in soft ground and susceptible of irregular operation. Moreover, the implements can be made lighter and less expensive than where traction driven operating mechanism must be built into the same.

With the above in view, it is one of the objects of the present invention to provide a tractor having improved means for establishing a continuously rotating or an intermittently operating power transmitting connection with an implement being propelled by the tractor. In regard to the intermittently operating connection, it is a more specific object to provide the same in the form of a crank mounted directly on the tractor so that power lift operations and the like can be transmitted directly from this crank to the implement through a rod which is either pushed or pulled by the throw of the crank.

In connection with this crank, it is a further object to provide an improved form of half revolution or one-cycle stop clutch to control the transmission of power from the tractor engine to the crank, which clutch can be quickly and easily engaged and which automatically disengages at the completion of the crank movement so that the operator's attention is not distracted from the guidance of the tractor.

A further object is to provide a power take-off mechanism from which the continuously rotating power or the above described intermittently operating crank power can be transmitted to an implement disposed either at the front end of the tractor or at the rear end thereof. Multiple row tractor cultivators are typical of implements which are now commonly disposed at the front end of the tractor.

Another object of the invention is to provide a power take-off mechanism constructed in the form of a compact unit which can be readily mounted on the exterior of the tractor and which can be operatively connected interiorly thereof with the selective speed transmission mechanism or one of the other engine driven parts, without necessitating any changes in the design of the tractor.

Still another object is to provide a construction in which the automatic clutch and the power take-off crank driven thereby are driven through worm gearing which affords the desired torque increase and proper speed of rotation for this crank; and in which this worm gearing, the automatic clutch, and the shaft which transmits continuous rotary take-off power, are so related and constructed that the entire assembly is of very small dimension and of simple and inexpensive construction.

Other objects and advantages of the invention will appear in the following detail description of a preferred embodiment thereof.

In the accompanying drawings illustrating such embodiment:

Figure 1 is a side view of a tractor embodying the principles of the present invention, with the near traction wheel removed, illustrating the general location of the power take-off mechanism with respect to different parts of the tractor construction;

Figure 1A is a fragmentary plan view of the power take-off side of the tractor;

Figure 2 is a side view on a larger scale showing the mounting of the power take-off mechanism on the transmission housing of the tractor, and with the adjacent side wall of this housing broken away to illustrate the relation of the transmission gearing therein;

Figure 3 is a vertical transverse sectional view through this transmission housing and the power take-off mechanism, taken on the plane of the line 3—3 of Figure 2;

Figure 4 is a vertical sectional view through the power take-off mechanism, taken on the plane of the line 4—4 of Figure 3;

Figure 5 is a similar sectional view taken approximately on the plane of the line 5—5 of Figure 3;

Figure 6 is a view similar to Figure 5, showing the clutch pawl released and the clutch rotating;

Figure 7 is a perspective view of one side of the driven clutch plate showing the mounting of the dogs thereon;

Figure 8 is a perspective view of the other side of this clutch plate showing the arrangement of the clutching rollers;

Figure 9 is a horizontal sectional view taken approximately on the plane of the line 9—9 of Figure 2;

Figure 10 is a similar sectional view taken approximately on the plane of the line 10—10 of Figure 2;

Figure 11 is a vertical sectional view illustrating the mounting of the clutch tripping lever in the power take-off housing; and Figure 12 is a perspective view of this clutch tripping lever.

Referring to Figures 1 and 1A, in the form of tractor shown, the front end of the frame is supported on steering wheels 16 and the rear end on traction wheels 17. The steering wheels 16 may be disposed relatively far apart and have knuckle pin mounting on the front axle, or these wheels may be disposed relatively close together and mounted directly on a swiveling axle swinging horizontally under the frame.

The motor, indicated generally at 18, is shown as being of the horizontal type with its crank shaft 19 extending transversely of the tractor, although the invention is not essentially limited to the use of this type of motor. The radiator 21 is disposed at the front end of the motor cylinders, and the fuel tank 22 extends rearwardly from this radiator over the cylinders.

The crank case 23 of the motor (Figure 2) comprises an integral part of a long housing 24 extending back to the driving mechanism for the rear wheels, this housing and the motor cylinders constituting the frame of the tractor. The crank shaft 19 has its ends extending outwardly through bearings in the side walls of the crank case 23, and mounted on one end of said shaft is a fly wheel 25 and on the other end thereof a clutch 26 (Figure 2). The clutch 26 controls the transmission of engine power to a spur gear 27 mounted concentrically of the clutch, which spur gear meshes with a relatively large spur gear 28 for transmitting the drive to the selective speed transmission mechanism, indicated generally at 29 in Figure 2. This selective speed transmission mechanism is enclosed in a separate portion or compartment of the housing 24, which is divided off from the crank case by a transverse partition wall 31. The large gear 28 is secured upon the end of a transverse shaft 32 mounted in bearings 33 (Figure 3) in the side walls of the housing 24. Splined for sliding movement on said shaft is a series of transmission gears 34, 35 and 36 which are adapted to be shifted into and out of mesh with large driving gears 37 and 38.

One of the aforesaid shiftable gears is also adapted to be moved into and out of mesh with a reversing gear unit 39 which is mounted for idling rotation on a countershaft 41 disposed below and parallel to the main transmission shaft 32. The shiftable gears 34—36 are moved into and out of their different driving positions through suitable shifting forks 42 mounted on a transverse shaft 43 in the upper part of the housing. The two large driving gears 37 and 38 transmit the engine power through a nest of differential gearing indicated generally at 44 (Figure 2) to a pair of sprocket wheels mounted concentrically with said driving gears. Said sprocket wheels transmit the drive through chains to sprocket wheels mounted on stub axles to which the rear traction wheels 17 are secured. In the preferred construction shown, the jack shaft, which is disposed axially of the gears 37, 38 and carries the driving sprocket wheels, is extended out from the main housing 24 through tubular housing extensions and has the driving sprocket wheels secured to its ends in chain housings 47 extending down to the axes of the traction wheels; although, if desired, these driving chains may be enclosed within the main housing 24, in which case the stub axles of the rear traction wheels will have bearing support in the side walls of this main housing. The operator's position on the tractor is indicated generally by the seat 51 at the rear of the tractor, from which the operations of steering the tractor, controlling the clutch 26 and effecting changes in the selective speed transmission mechanism 29 are performed.

The general arrangement and operation of the clutch 26 and the selective speed transmission mechanism 29, and one method of transmitting the drive from this latter mechanism to the rear traction wheels, is illustrated and described in the patent of Louis W. Witry, No. 1,702,371, dated February 19, 1929, to which attention is directed for a more thorough disclosure of the tractor driving mechanism.

It will be observed from the foregoing that the main transmission shaft 32 is driven from the motor 18 through the clutch 26 by which the rotation of the shaft 32 can be stopped and started, but that this shaft can rotate independently of motion of the tractor by placing the selective speed gears in neutral. As disclosed in the above mentioned Witry patent, the complete disengagement of the clutch 26 is also effective to apply braking retardation to the rotation of the shaft 32. In transmitting take-off power to the implement, I preferably derive this power from the shaft 32. Referring to Figure 3, a spur gear 53 is mounted for sliding movement along the splines of the shaft 32, this gear having a grooved hub 54 in which a shifting fork 55 engages. Said fork is secured to a shaft 56 extending transversely out through the side wall of the housing 24. Any suitable arrangement of actuating parts extends from this shaft 56 to a suitable operating member preferably located adjacent to the driver's seat 51, and through which the gear 53 can be shifted into and out of the dotted line position shown in Figure 3.

When in such dotted line position, this gear meshes with an idler gear 58 which is rotatably mounted on the lower countershaft 41. The tractor is constructed with the shiftable gear 53 and idler gear 58 installed therein as a part of its standard equipment. Formed in the side wall of the housing 24, below the countershaft 41, is a cylindrical hole 59 opening into the transmission compartment. When the tractor is sold without any power take-off attachment thereon this hole is closed by the attachment of a removable closure plate (not shown) to the outer s'de of the housing, which plate may be secured by the cap screws or studs 61 which later secure the power take-off device to the tractor. When the power take-off mechanism is to be installed, this closure plate is removed and the take-off device, indicated in its entirety at 62, is mounted in place by inserting a tubular boss portion 63 thereof into the hole 59. Said boss portion is formed as an integral extension of an upper casing section 64 in wh'ch part of the power take-off mechanism is housed. An attaching flange 67 projects from the outer portion of the boss 63 and this flange is rigidly secured to the main housing 24 by the cap screws or studs 61 (Figure 2). Such constitutes the entire operation of establish'ng the driving relation between the motor driven parts of the tractor and the power take-off device.

The tubular boss has rotatably mounted therein a transverse shaft 68 on the inner end of which a pinion 69 is keyed. This pinion is pushed into mesh with the idler gear 58 when the boss 63 is inserted into the hole 59. Mounted in the boss 63 is a bearing bushing 71 which is locked against rotation therein by the provision of threads on the bushing screwing into the threaded boss, a lock nut 72 screwing over the inner end of the bushing and engaging the end of the boss. This nut passes freely through the hole 59. The shaft 68 is mounted in inner and outer roller bearings 73 supported in the bushing 71, said shaft, at its outer end, having a spiral bevel gear 74 mounted thereon in the casing section 64. The shaft 68, gears 69, 74. and bearings 73 come completely assembled in the boss 59 and casing section 64 and are mounted as a unit on the tractor. It will be noted that the lubricant from the transmission housing 24 can pass through the bearings 73 and around the gear 74 into the power take-off casing, thereby lubricating these bearings and the gearing and other operating parts in the power take-off casing. A longitudinal rib 75 may be formed in the bottom of the transmission housing to reenforce the same and to form an oil sump or receptacle in proximity to the end of the bearing bushing 71.

Referring to Figures 4, 5 and 9, the gear 74 meshes with a similar spiral bevel gear 76 which is keyed to a shaft 77 extending longitudinally through the upper section 64 of the power take-off casing. The latter shaft is mounted in roller bearings 78, 78' at the rear and front ends of the casing section 64. Surrounding the shaft beyond these bearings are caps 79, 79' which are suitably bolted to the ends of the casing and have packing material engaging with the shaft for preventing the loss of lubricant, the removal of these caps permitting removal of the adjacent bearings, 78, 78' through the openings closed by the caps.

The shaft 77 is adapted to transmit continuously rotating take-off power either to an implement disposed at the rear end of the tractor or to one disposed at the front end thereof. For effecting the driving connection, the rear end of said shaft is provided with a plurality of splines 81 and the front end of said shaft is likewise provided with splines 82 (Figure 2). It will be noted that the location of the power take-off unit 62 disposes the longitudinal axis of the shaft 77 in such relation that the shafting extensions leading rearwardly or forwardly therefrom clear the adjacent chain housing 47 and the fly wheel 25 on the inner sides thereof.

The casing 64 with its longitudinal shaft 77 and transverse shaft 68 constitutes one section or unit of the power take-off mechanism. The casing 64 is provided with a marginal flange 64' which extends outwardly from the bottom of the casing section 64. The other section consists of a power lift section.

Such power lift section comprises a casing section 65 connected with the bottom of the upper casing section 64. Formed around the upper margin of this lower casing section 65 is an attaching flange 65' which is secured to the flange 64' by cap screws 66.

Assembled as a completely operative unit within this lower casing section are a worm wheel, half-revolution clutch, power lift shaft driven thereby, and the clutch tripping mechanism, as I shall now describe. A worm 83 on the shaft 77 is adapted to mesh with a worm wheel 84 constituting part of the half revolution or one-cycle stop clutch indicated generally at 85. The worm wheel constitutes the driving element of the clutch, the driven element thereof being in the form of a plate member 86 mounted coaxially of the worm wheel on the inner side thereof. As best shown in Figures 3 and 10, both clutch elements are mounted on a shaft 87, the ends of which are supported in bearing bushings 88, 88' seated in outer and inner bosses 89, 89' projecting from the sides of the lower casing section 65. Thus the rotating assembly has bearing support only in this lower section. The worm wheel 84 is freely rotatable on the shaft 87, a bushing 91 being interposed between the hub of said wheel and the shaft. The driven clutch element 86 has a laterally extending hub portion 92 which is secured to splines 93 on the inner portion of the shaft 87. Mounted on the outer end of said shaft is the crank 94 through which power lift movement and other intermittent operations are transmitted to the implement.

Referring to the detail construction of the clutch, and with particular reference to Figures 4 to 8, inclusive, it will be seen that the depressed inner side of the worm wheel 84 is formed with a series of internal notches or recesses 96. Carried by the driven clutch element and adapted to engage in these recesses are two clutching rollers 97, 97'. These rollers are mounted on pins 98, each of which is supported at opposite ends in a link 99 and in the corresponding one of a pair of clutch dogs 101, 101'.

As best shown in Figure 8, the inner end of each link 99 is pivotally mounted at 102 on a boss 103 projecting laterally from a thickened portion 86' of the plate member 86. The clutch rollers are disposed on the inner sides of the links 99, and the roller pins 98 pass through arcuate slots 104 in said plate member to the opposite side thereof. The outer edges of the two links 99 are notched out adjacent to their respective rollers, as indicated at 105, so as to permit the rollers to move outwardly into the bottoms of the recesses 96, the notches 105 clearing the raised portions between said recesses. On the other side of the plate member 86 the pins 98 are mounted in the swinging ends of the two clutch dogs 101, 101'. Both of these dogs are pivotally supported on pins 106 secured to the plate member. The inwardly extending arm of the dog 101 has a tension spring 107 connected thereto, the other end of this spring being connected to a stud 108 projecting from the plate 86. The body of said plate is preferably provided with a long slot 109 to permit part of the spring 107 to be received therein. The action of the spring 107 is normally to swing the outer end of the dog 101, and its associated clutching roller 97, outwardly into clutch engaging position. Both dogs are made to swing correspondingly through a connecting link 111 pivotally coupled by pins 112 to the outwardly extending portion of the dog 101 and to the inwardly extending portion of the other dog 101'. The hub portion 92 of the plate member has an outwardly extending lug 113 which overlies the connecting link 111 and holds the same in operative position on its pivots 112.

By virtue of this link connection, the two dogs 101 and 101' both swing inwardly or outwardly concurrently. Formed in the periphery of the plate member 86 at diametrically opposite points thereof are notches 114, 114'. The two pivoted dogs are provided with shoulder portions or noses 115, 115 which cooperate with these notches. The operation of the clutch is controlled by a clutch pawl 116, which is movable into and out of the notches 114. When said pawl is engaging in one of these notches, the driven element of the clutch is locked against rotation in either direction, the pawl at this time bearing against one of the shoulders 115 and holding the latter pressed back substantially flush with the rear edge of the notch. This holds the outer portions of the two dogs 101, 101' in retracted positions against the tension of the spring 107, thereby holding the two clutching rollers 97 out of the driving recesses 96. When the pawl 116 is swung out of the notch in which it is engaging, the outer portions of the two dogs are permitted to swing outwardly under the tension of the spring 107, thereby carrying the rollers 97 into engagement with diametrically opposite recesses 96 and causing the plate member 86 to rotate with the worm wheel 84. After the clutch has been tripped in this manner, the pawl 116 is allowed to return into engagement with the periphery of the plate member 86. In this position it is encountered by the nose 115 of the next succeeding dog when the clutch plate has rotated through a half revolution, the two dogs thereupon being swung inwardly to retract the rollers 97 from the recesses 96 and the nose of the pawl 116 dropping into the adjacent notch 114 for locking the driven clutch element against further rotation.

As shown in Figure 8, the periphery of the plate member 86 may be formed with flattened or sloping surfaces 117 at the leading side of each notch 114 to facilitate the engagement of the pawl 116 with the shoulders 115 and the movement of said pawl into the adjacent notch. It will be noted that the links 99 reenforce the pivotal mounting of the rollers 97, 97' through which the torque is transmitted from the driving to the driven clutch element.

The lower housing section 65 is formed with an extending portion 118 to receive the tripping pawl 116. This pawl is mounted on an operating shaft 119 having bearing support in the housing extension 118. A compression spring 121 is seated at one end in a socket 122 formed in said housing extension, and at its other end engages over a stud 123 projecting from the pawl 116, this spring normally tending to swing said pawl into one of the notches 114 for disengaging the clutch. As shown in Figure 11, the tripping shaft 119 is provided with a flattened inner portion to which the pawl 116 is secured by a pin 124. The outer end of said shaft is bent downwardly to form the operating arm 125 (Figures 2 and 11), which is adapted to be coupled through any suitable actuating connections with a clutch control member disposed in proximity to the operator's seat 51.

The tripping of the clutch only requires a momentary actuation of this control member by the operator. Thereupon, the crank 94 revolves through a half revolution and comes to rest when the pawl 116 snaps back into the next succeeding notch 114, such automatically disengaging the clutch and locking the crank 94 in the opposite position.

It will be noted that the control parts for the half-revolution clutch are carried directly by the casing section 65 so that the entire construction can be mounted as a unit on the upper casing section. The power lift mechanism or other intermittently operated part of the implement can be connected with this crank through a forwardly or rearwardly extending rod 127 or 128 (Figure 1) which is either pushed or pulled in the lifting or other operating movement, the automatic locking characteristic of the clutch being of considerable advantage in connection with power lift operations for holding the implement in raised position. By arranging the worm wheel 84 and the clutch parts below and in the plane of the shaft 77, the assembly is made of small transverse dimension so that the operating rod extending to the crank 94 will clear the adjacent chain housing 47 and other proximate parts of the tractor. When using the forwardly extending rod 127, the latter is preferably bowed downwardly to clear the flywheel 25 in the throw of the crank. It will be understood that the clutch and crank can be disposed above the shaft 77, if desired. Obviously the two take-off power sections comprising the continuously rotating shaft element 77 and the intermittently operating crank element 94 can be secured and installed on the tractor at the same time. Continuously rotating power may be transmitted to the implement, and, at the same time, intermittently operating crank power can also be transmitted thereto, the engaging and releasing of the clutch 85 interfering in nowise with the transmission of power through the shaft 77. The operation of both power take-off connections is controlled by the shiftable gear 53, which is preferably moved into disengaged position when neither power take-off connection is to be used; and, the operation of both power take-off connections is also controlled by the main power transmission clutch 26.

Conventional operating connections leading from the shifting rod 56 and from the tripping lever 125 to the operator's position on the tractor may be established by the farmer in installing the power take-off mechanism, such connections not being shown because they may be of any suitable type. Either throw of the crank 94 may be utilized in transmitting the actual lifting effort or other operating force, such also facilitating the establishment of operating connections to implements disposed either at the front or rear end of the tractor.

While I have shown what I regard to be the preferred embodiment of my invention, nevertheless it will be understood that such is merely exemplary and that numerous modifications and

I claim:

1. The combination with a tractor comprising a motor, driving wheels, power transmission mechanism between said motor and said wheels, and a housing enclosing said power transmission mechanism, of a power take-off mechanism comprising a shaft driven by said motor and extending laterally from said housing, means for controlling the driving of said shaft from said motor, a crank driven by said shaft and swinging in a substantially vertical plane for transmitting power lift movement to an implement at either end of the tractor, and a half revolution clutch including driving and driven elements carried by said shaft for controlling the transmission of power through said shaft to said crank.

2. The combination with a tractor comprising a motor, driving wheels and power transmission mechanism between said motor and said wheels, of power take-off mechanism on the tractor comprising a longitudinally extending shaft and a crank for respectively transmitting either rotary or oscillatory movement to implement parts at either end of said tractor, and clutch controlled means for operatively connecting the power transmission mechanism with said power take-off mechanism independently of the operation of said driving wheels.

3. The combination with a tractor comprising a motor, of power take-off mechanism on the tractor comprising a shaft for transmitting rotary movement to implement parts associated with the tractor, a crank for transmitting oscillatory movement to other implement parts, and a one-cycle stop clutch for controlling the transmission of take-off power through said crank.

4. The combination with a tractor comprising a motor, of power take-off mechanism mounted on the side of the tractor comprising a longitudinally extending shaft for transmitting rotary take-off power to implement parts at either end of the tractor, said take-off mechanism also comprising a crank driven by said shaft for transmitting oscillatory movement to implement parts at either end of the tractor, and a half revolution clutch for controlling the transmission of take-off power through said crank.

5. The combination with a tractor comprising a motor, driving wheels, power transmission mechanism between said motor and said wheels, and a housing enclosing said power transmission mechanism, of power take-off mechanism comprising a transverse shaft extending laterally from said housing, a longitudinal shaft disposed at the side of said housing, means for transmitting power from the motor to said transverse shaft, gearing connecting said shafts, said longitudinal shaft being adapted to transmit rotary take-off power to implement parts at either end of the tractor, a crank disposed at the side of the tractor for transmitting oscillatory take-off power to implement parts at either end of the tractor, and mechanism for driving said crank from said transverse shaft including a clutch for controlling the rotation of said crank.

6. The combination with a tractor comprising a motor, of power take-off mechanism on the tractor comprising a longitudinally extending shaft for transmitting rotary take-off power to implement parts associated with the tractor, a worm on said shaft, a worm wheel driven by said worm, and a crank adapted to be driven by said worm wheel for transmitting oscillatory take-off power to implement parts associated with the tractor.

7. The combination with a tractor comprising a motor, of power take-off mechanism on the tractor comprising a longitudinally extending shaft for transmitting rotary take-off power to implement parts associated with the tractor, a worm rotating with said shaft, a worm wheel driven by said worm, an automatic disconnect clutch embodied in said worm wheel and driven thereby, and a crank adapted to be driven by said clutch for transmitting oscillatory take-off power to implement parts associated with the tractor.

8. The combination with a tractor comprising a motor, of power take-off mechanism on the tractor comprising a worm arranged to be driven by said motor, a worm wheel driven by said worm, a crank shaft adapted to be driven by said worm wheel for transmitting oscillatory take-off power to implement parts associated with the tractor, and optionally operable clutch mechanism carried by said crank shaft for controlling the transmission of power from said worm wheel to said crank shaft.

9. The combination with a tractor comprising a motor, driving wheels, power transmission mechanism between said motor and said wheels, and a housing enclosing said power transmission mechanism, of power take-off mechanism comprising a transverse shaft extending laterally from said housing, means for driving said transverse shaft from said power transmission mechanism, a longitudinal shaft disposed at the side of said housing, gearing connecting said shafts, said longitudinal shaft being adapted to transmit rotary take-off power to implement parts at either end of the tractor, a worm driven by said longitudinal shaft, a worm wheel driven by said worm, an automatic disconnect clutch driven by said worm wheel, and a crank disposed at the side of the tractor for transmitting oscillatory take-off power to implement parts at either end of the tractor, said crank deriving its operating power from said automatic disconnect clutch.

10. The combination with a tractor comprising a motor, driving wheels, selective speed transmission mechanism between said motor and said wheels, and a housing enclosing said transmission mechanism, of power take-off mechanism comprising a take-off housing mounted on the side of the main housing enclosing said transmission mechanism, a transverse shaft extending between said housings, disconnectible means for transmitting power from said selective speed transmission mechanism to said transverse shaft, a power take-off shaft mounted in said take-off housing and having its opposite ends projecting longitudinally therefrom for establishing coupled connection with extension shafts leading to implement parts at either end of the tractor, a pair of bevel gears for transmitting power from said transverse shaft to said power take-off shaft, a worm on said power take-off shaft, a worm wheel meshing with said worm within said take-off housing and disposed substantially in the vertical plane of said take-off shaft, a half revolution clutch embodied within said worm wheel, a crank mounted on the outer side of said take-off housing and operatively connected with the driven element of said clutch, said crank swinging in a substantially vertical fore-and-aft plane for transmitting oscillatory take-off power to implement parts at either end of the tractor, and means for controlling the engagement and disengagement of said half revolution clutch.

11. The combination with a tractor comprising a motor, of power take-off mechanism on the tractor comprising a shaft for transmitting rotary movement to implement parts associated with the tractor, a crank for transmitting oscillatory movement to other implement parts, clutch mechanism for controlling the transmission of take-off power through said crank and operatively driven from said shaft, and a housing supporting said crank and clutch mechanism and detachably connected with the tractor.

12. The combination with a tractor comprising a motor, of power take-off mechanism on the tractor comprising a longitudinally extending shaft for transmitting rotary take-off power to implement parts associated with the tractor, a worm rotating with said shaft, a worm wheel driven by said worm, a clutch embodied in said worm wheel and driven thereby, and a crank adapted to be driven by said clutch for transmitting oscillatory take-off power to implement parts associated with the tractor.

13. The combination with a tractor comprising a motor, driving wheels, power transmission mechanism between said motor and said wheels, and a housing enclosing said power transmission mechanism, of power take-off mechanism comprising a transverse shaft extending laterally from said housing, means for driving said transverse shaft from said power transmission mechanism, a longitudinal shaft disposed at the side of said housing, gearing connecting said shafts, said longitudinal shaft being adapted to transmit rotary take-off power to implement parts at either end of the tractor, a crank disposed at the side of the tractor for transmitting oscillatory take-off power to implement parts at either end of the tractor, and gear means including an automatic clutch for operatively connecting said longitudinal shaft with said crank for actuating the latter.

14. The combination with a tractor comprising a motor, of power take-off mechanism on the tractor comprising a longitudinally extending shaft for transmitting rotary take-off power to implement parts associated with the tractor, a worm rotating with said shaft, a worm wheel driven by said worm, a clutch operated by said worm wheel, and a second power take-off means driven by said clutch for transmitting power to operating parts associated with the tractor.

15. The combination with a tractor comprising a motor, of power take-off mechanism on the tractor comprising a longitudinally extending shaft for transmitting rotary take-off power to implement parts associated with the tractor, a second power take-off means, and means for driving the latter from said power take-off shaft including an automatic disconnect clutch for controlling the transmission of power from said shaft to said second power take-off means.

16. The combination with a tractor comprising a motor, of power take-off mechanism on the tractor comprising a longitudinally extending shaft for transmitting rotary take-off power to implement parts associated with the tractor, a worm rotating with said shaft, a worm wheel driven by said worm, a second power take-off means, and means operatively connecting the latter with said worm wheel including an automatic disconnect clutch operative to control the transmission of power to said second power take-off means.

17. In a tractor, a motor, means serving as a transmission and differential housing therefor, a shaft therein, a casing detachably connected with said housing, a shaft journaled in said casing and adapted to be operatively connected with said first shaft, a longitudinal shaft also journaled in said casing and connected with said second mentioned shaft, a power lift device carried by the casing, and worm gearing connecting said device with said longitudinal shaft.

18. In a tractor having a motor and a housing enclosing differential and transmission mechanism, a casing detachably connected with said housing, means carried thereby and operatively connected to be driven from said motor, a longitudinally disposed shaft journaled in said casing, gear means connecting said shaft with said first means, and power lift mechanism including a transverse shaft operatively connected to be driven from said longitudinally disposed shaft.

19. In a tractor having a motor and a housing enclosing differential and transmission mechanism, a casing adapted to be secured to said housing, means carried thereby and operatively connected to be driven from said motor, a longitudinally disposed shaft journaled in said casing, gear means connecting said shaft with said first means, a transversely disposed power lift shaft supported for rotation by said casing, and worm and gear means for driving said transverse shaft from said longitudinal shaft.

20. In a tractor, a motor, means serving as a transmission and differential housing therefor, a shaft journaled therein, a casing detachably connected with said housing, a shaft journaled in said casing and adapted to have a releasable driving connection with said first mentioned shaft, thereby providing for the removal of said casing and said shaft journaled therein from said housing, power lift mechanism supported by said casing, and means for establishing driving connection between said power lift mechanism and said second mentioned shaft.

21. In a tractor having a motor and a housing enclosing transmission mechanism, a casing adapted to be secured to said housing and defining in connection therewith a second housing, means journaled for rotation in said second housing and operatively connected to be driven from said motor, a shaft journaled in said second housing and operatively connected to be driven from said means, and a power lift device also journaled for rotation in said second housing and operatively connected to be driven from said shaft.

22. In a tractor having a motor and a housing enclosing transmission mechanism, a casing adapted to be secured to said housing and defining in connection therewith a second housing, means journaled for rotation in said second housing and operatively connected to be driven from said motor, a shaft journaled in said second housing and operatively connected to be driven from said means, and a power lift device including a second shaft also journaled for rotation in said housing and arranged at substantially right angles to said first mentioned shaft, and means operatively connecting said second shaft with said first shaft.

23. In a tractor having a motor and a transmission housing with an opening therein, a casing adapted to be secured to said housing over said opening therein, a shaft journaled in said casing and adapted to extend through said opening into said housing, means operatively connecting the shaft to be driven from the tractor motor, a second shaft journaled for rotation in said casing, means connecting said shafts together, a third shaft journaled in said casing and operatively connected with the second shaft to be driven therefrom, and operating means driven from said third shaft.

24. In a tractor having a motor and a transmission housing with an opening therein, a casing adapted to be secured to said housing over said opening therein, a shaft journaled in said casing and adapted to extend through said opening into said housing, means operatively connecting the shaft to be driven from the tractor motor, a gear mounted on said shaft, a second shaft journaled for rotation in said casing, and having a gear mounted thereon and adapted to be meshed with said first gear, a worm member carried by said second shaft, a third shaft journaled in said casing and having a worm gear member adapted to be meshed with said worm member, and operating means driven from said third shaft.

25. In a tractor having a motor and a transmission housing with an opening therein, a casing adapted to be secured to said housing over said opening therein, a shaft journaled in said casing and adapted to extend through said opening into said housing, means operatively connecting the shaft to be driven from the tractor motor, a gear mounted on said shaft, a second shaft journaled for rotation in said casing, and having a gear mounted thereon and adapted to be meshed with said first gear, a worm member carried by said second shaft, a third shaft journaled in said casing and disposed at right angles to said second shaft and extending substantially transversely of the tractor, a worm gear on said third shaft adapted to mesh with said worm member, and half revolution clutch means driven from said worm gear.

26. The combination with a tractor comprising a motor, of power take-off mechanism on the tractor comprising a worm arranged to be driven by said motor, a constantly driven worm wheel driven by said worm, means serving as a crank shaft journaled to rotate about an axis concentric with the axis of rotation of said worm wheel and adapted to be driven by said worm wheel for transmitting oscillatory take-off power to implement parts associated with the tractor, and means for connecting the crank shaft to the worm wheel and automatically disconnecting it therefrom when the crank shaft has been rotated through a predetermined angle with the worm wheel.

27. In a tractor, a motor, means serving as a transmission and differential housing therefor, a shaft journaled therein, a casing detachably connected with said housing, a shaft journaled in said casing and adapted to have a releasable driving connection with said first mentioned shaft, thereby providing for the removal of said casing and said shaft journaled therein from said housing, a worm mounted on said second shaft, a constantly rotatable worm wheel journaled in said casing and meshing with said worm, a crank shaft journaled to rotate about an axis concentric with the axis of rotation of said worm wheel, and means for connecting the crank shaft to the worm wheel and automatically disconnecting it therefrom when the crank shaft has been rotated through a predetermined angle with the worm wheel.

28. In a tractor, a motor, means serving as a transmission and differential housing therefor, a shaft journaled therein, a supporting member detachably connected with said housing, a shaft journaled in said supporting member and adapted to have a releasable driving connection with said first mentioned shaft, thereby providing for the removal of said supporting member and said shaft journaled therein from said housing, power lift mechanism supported by said supporting member and including a constantly rotating member, an optionally operable member, means for connecting it to the constantly rotating member and means for automatically disconnecting it therefrom, and means for establishing driving connection between the constantly rotating member of said power lift mechanism and said second mentioned shaft.

29. In a tractor having a motor and a transmission housing with an opening therein, a supporting member adapted to be secured to said housing over said opening therein, a shaft journaled in said supporting member and adapted to extend through said opening into said housing, means establishing a releasable driving connection between said shaft and the tractor motor, thereby providing for the removal of said supporting member and said shaft journaled therein from said housing, power lift mechanism supported by said supporting member and including a constantly rotating member, an optionally operable member, means for connecting the latter to the constantly rotating member and means for automatically disconnecting it therefrom, and means for establishing driving connection between the constantly rotating member of said power lift mechanism and said second mentioned shaft.

THEOPHILUS BROWN.